United States Patent
Tonegawa

(10) Patent No.: US 10,477,040 B2
(45) Date of Patent: Nov. 12, 2019

(54) IMAGE PROCESSING APPARATUS AND METHOD

(71) Applicant: CANON KABUSHIKI KAISHA, Tokyo (JP)

(72) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/171,947

(22) Filed: Oct. 26, 2018

(65) Prior Publication Data

US 2019/0141201 A1    May 9, 2019

(30) Foreign Application Priority Data

Nov. 6, 2017    (JP) .................................. 2017-214190

(51) Int. Cl.
*H04N 1/00*    (2006.01)
*H04N 1/32*    (2006.01)

(52) U.S. Cl.
CPC ..... *H04N 1/00225* (2013.01); *H04N 1/00214* (2013.01); *H04N 1/32037* (2013.01)

(58) Field of Classification Search
CPC ........... H04N 1/00225; H04N 1/32037; H04N 1/00214
USPC ........................................................ 358/1.15
See application file for complete search history.

(56) References Cited

U.S. PATENT DOCUMENTS

| | | | |
|---|---|---|---|
| 8,817,308 B2 | 8/2014 | Tonegawa | |
| 2002/0099778 A1* | 7/2002 | Kogure | G06Q 10/107 709/206 |
| 2011/0063687 A1* | 3/2011 | Inui | H04N 1/00214 358/442 |
| 2013/0229694 A1* | 9/2013 | Tonegawa | H04N 1/00217 358/426.01 |

FOREIGN PATENT DOCUMENTS

| | | |
|---|---|---|
| JP | 05276287 A | 10/1993 |
| JP | 08242482 A | 9/1996 |
| JP | 2013214951 A | 10/2013 |

OTHER PUBLICATIONS

Katsumasa, Facsimile Equipment, Jan. 22, 1993, Japanese Patent Application Publication Listed On IDS, JP 05-276287, All Pages (Year: 1993).*

* cited by examiner

*Primary Examiner* — Ted W Barnes
(74) *Attorney, Agent, or Firm* — Venable LLP

(57) ABSTRACT

An image processing apparatus that accepts a designation of a transmission setting; converts, in accordance with the transmission setting, image data generated from an original of a plurality of pages by a scanner to one or more files; if a designation for converting one page of image data to one file is made by the transmission setting, controls a network interface to transmit a plurality of files of converted image data in parallel; and if a designation for converting a plurality of pages of image data included in the original to one file is made by the transmission setting, controls the (Continued)

network interface to transmit, for the plurality of pages worth of image data converted to the one file, a subsequent page of image data after transmission of a preceding page of image data ends.

7 Claims, 10 Drawing Sheets

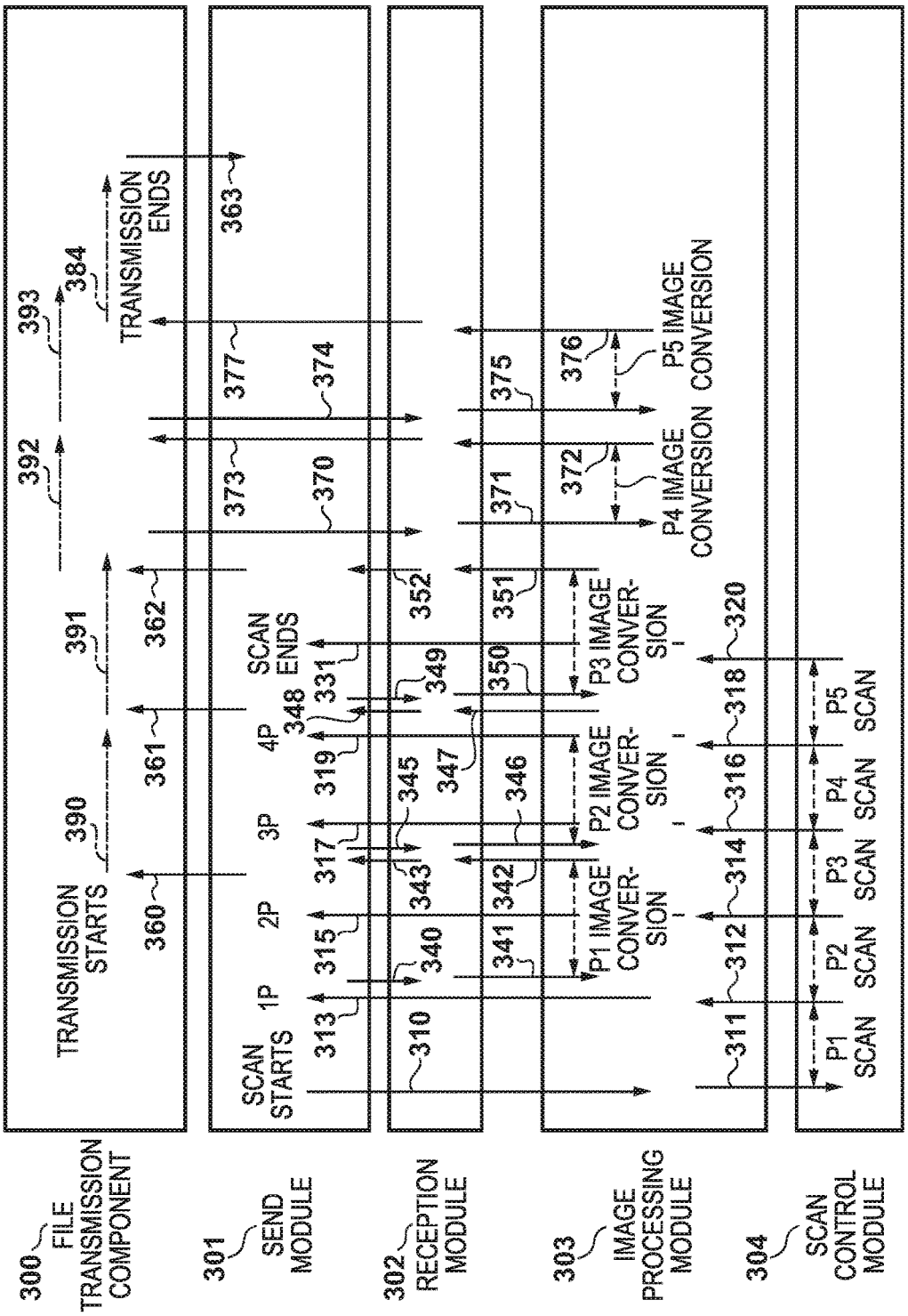

IMAGE PROCESSING APPARATUS AND METHOD

BACKGROUND OF THE INVENTION

Field of the Invention

The present invention relates to an image processing apparatus and a method.

Description of the Related Art

There is an image processing apparatus that creates a file by converting original image data scanned by a scanner into a designated file format and transmits the created file to a file server on a network.

Japanese Patent Laid-Open No. 2013-214951 recites a technique for improving a transmission speed by performing image conversion during an image scan by a scanner.

Japanese Patent Laid-Open No. 5-276287 recites a technique for, in a facsimile transmission that uses an ISDN communication network, improving transmission speed by transmitting image data in parallel over a plurality of channels for information (B channels).

Japanese Patent Laid-Open No. 8-242482 recites a technique for, in mobile communication, improving transmission speed by transmitting in parallel by using a plurality of carriers that have different frequencies.

In addition, direct transmission, in which scanning is executed while transmitting image data in a facsimile, is known, and there is a technique for causing a scanner to start scanning an image when an amount of scanned but untransmitted data becomes smaller than a fixed value. Because the data size of each page of an image to transmit differs depending on the respective image to transmit, when the data size for each page or a communication speed for data transmission changes, the scan rate is changed in conjunction with the change.

An MFP (Multi Function Peripheral) that converts image data scanned by a scanner into a file of a designated file format and transmits the file to a destination on a network is used by a plurality of users, and thus it is desirable to quickly yield the MFP to a subsequent user. However, there are at least some users who confirm whether a transmission was definitely made to a destination address, and because these users wait in front of the MFP for transmission completion to confirm the completion of transmission, this is a reason why other users are made to wait. For this reason, an apparatus that has a short amount of time from the start of a scan of an original until the completion of transmission is desired.

SUMMARY OF THE INVENTION

An aspect of the present invention is to eliminate the above-mentioned problem with conventional technology.

A feature of the present invention is to provide a technique for shortening an amount of time from the start of scanning until completion of transmission, by an image processing apparatus transmitting a plurality of files in parallel.

According to a first aspect of the present invention, there is provided an image processing apparatus comprising a scanner, a network interface, a memory, and a processor, that accepts a designation of a transmission setting; converts, in accordance with the transmission setting, image data generated from an original of a plurality of pages by the scanner to one or more files; if a designation for converting one page of image data to one file is made by the transmission setting, controls the network interface to transmit a plurality of files of converted image data in parallel; and if a designation for converting a plurality of pages of image data included in the original to one file is made by the transmission setting, controls the network interface, for the plurality of pages worth of image data converted to the one file, to transmit a subsequent page of image data after transmission of a preceding page of image data ends.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a sequence diagram for describing operations of a module group according to an embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

<System View>

Figure 1:
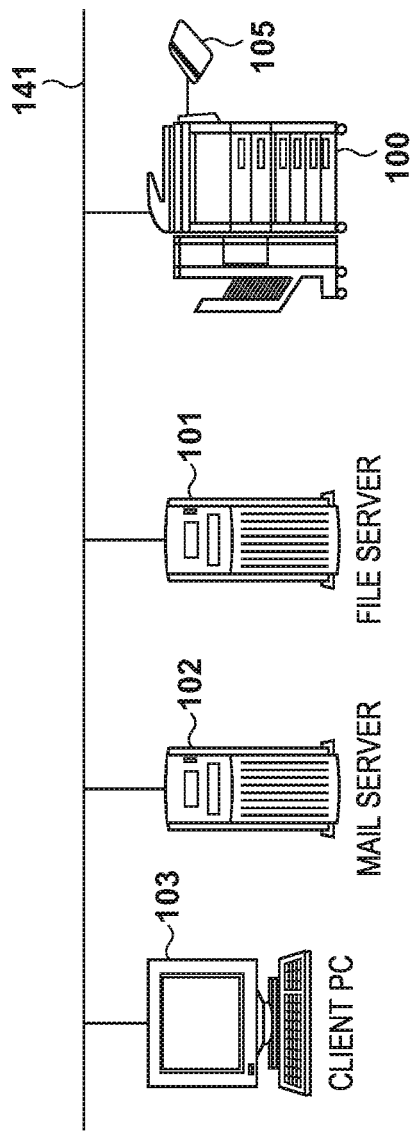
FIG. 1 is a system configuration diagram according to an embodiment.

Firstly, with reference to FIG. 1, description is given for an example of a configuration of an image processing system that includes an image processing apparatus according to an embodiment of the present invention. In the image processing system according to the present embodiment, a MFP 100, a file server 101, a mail server 102, and a client PC 103 are connected via a network 141.

The MFP 100 is a full-color image processing apparatus that employs an electro-photographic method, and is provided with copy, fax, and printer functions. The MFP 100 is also provided with a SEND function for transmitting a file scanned by a scanner to an external device, and an Internet facsimile (IFAX) function for communicating an image scanned by a scanner with a device of the same type and for printing a received image. The file server 101 can store a file transmitted by the MFP 100 in accordance with a communication protocol such as FTP, SMB, or WebDAV. The mail server 102 can communicate with the MFP 100, the client PC 103, or the like by SMTP or the POP3 protocol, and distribute an email to which a file is attached. Image viewer software is installed in the client PC 103, and the client PC 103 can display a file scanned by the MFP 100, and can use the printer function to print an image corresponding to the scanned file using the MFP 100. In the client PC 103, electronic mail client software is installed, and the client PC 103 can transmit and receive email via the mail server 102 or a mail server on the Internet (not illustrated).

<Hardware Configuration Diagram>

Figure 2:
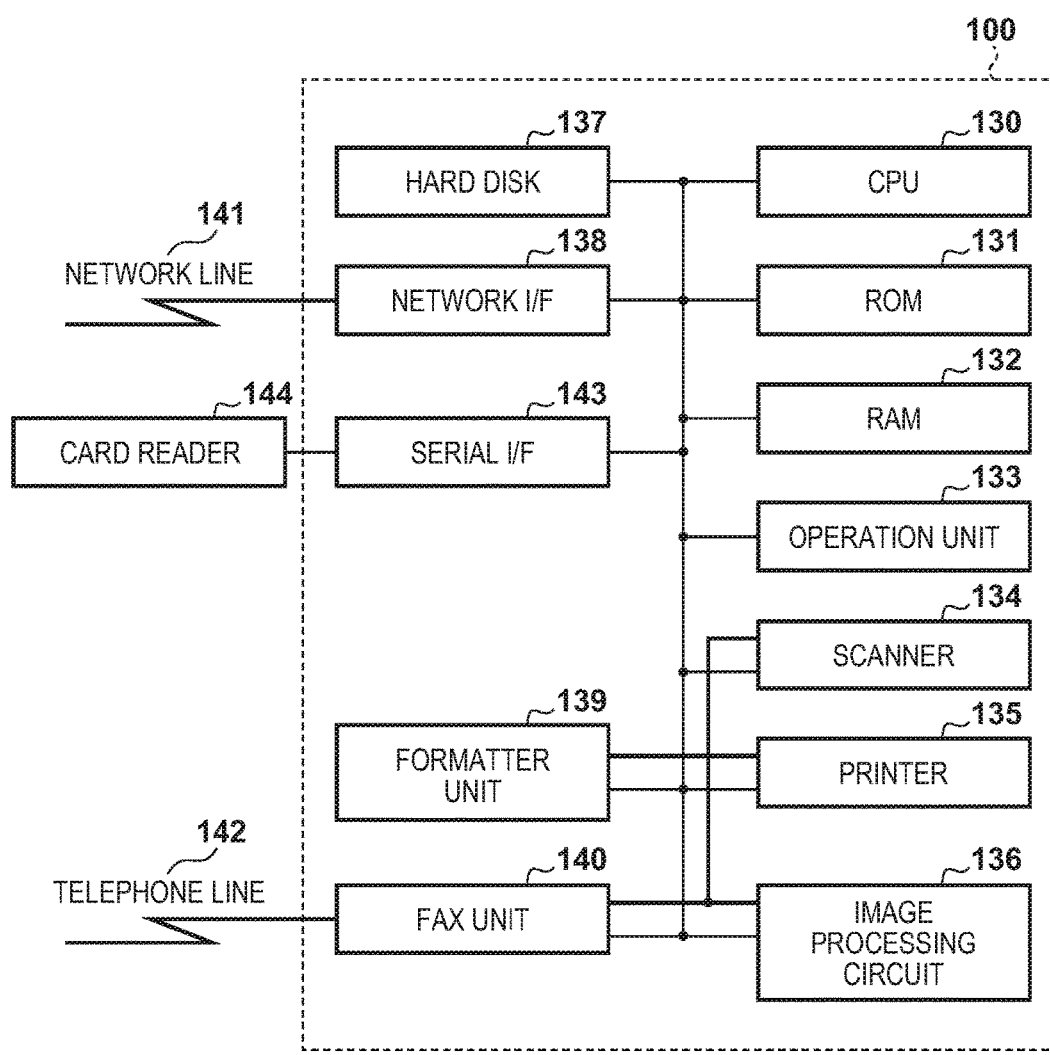
FIG. 2 is a hardware configuration diagram of an MFP according to an embodiment.

Next, with reference to FIG. 2, description is given for an example of a hardware configuration of the MFP 100. The MFP 100 is provided with a CPU 130, a ROM 131, a RAM 132, an operation unit 133, a scanner 134, and a printer 135. In addition, the MFP 100 is provided with an image processing circuit 136, a hard disk 137, a network I/F 138, a serial I/F 143, a formatter unit 139, and an fax unit 140.

The CPU 130 is a control circuit that performs control of the MFP 100 as a whole by using the RAM 132 and a program stored in the ROM 131. The operation unit 133 in one example is a circuit that has a display panel and physical keys such as a start key or a numeric keypad, displays software buttons on the display panel, and detects a user's finger touching a button to smoothly execute a user operation. The scanner 134 scans an image on an original, and outputs image data thereof. In the present embodiment, data generated by the scanner 134 is referred to as image data. The printer 135 prints an image based on image data onto a printing medium (a sheet). The image processing circuit 136 includes, for example, a large capacity image memory, an image rotation circuit, a resolution scaling circuit, an encoding/decoding circuit for JPEG, TIFF, PDF, XPS, or the like, and can execute various image processing such as shading, trimming, and masking. In the present embodiment, image data converted by the image processing circuit 136 is referred to as converted image data. In addition, in a case of converting image data generated by a scan to a PDF file or the like to transmit the file by the SEND function as described later, this file is referred to as a scan file. A scan file may include one or more pieces of converted image data.

The hard disk 137 is a mass storage medium that is connected by an I/F such as SCSI or IDE. The network I/F 138 is a circuit for connecting to a network line such as Ethernet (registered trademark) represented by 10BASE-T and 100BASE-T, or token ring. The formatter unit 139 is a rendering circuit for generating an image to be printed by the printer 135. In a case of receiving PDL (Page Description Language) data from a PC via the network I/F 138, image data is generated from the received PDL data. The image data is subjected to image processing by the image processing circuit 136, and printed by the printer 135. The scanner 134, the printer 135, the image processing circuit 136, and the formatter unit 139 are connected to a high speed video bus that is separate from a CPU bus from the CPU 130, and are configured to be able to transfer image data at high speed. The MFP 100 has the copy function for subjecting image data generated by the scanner 134 to image processing by the image processing circuit 136, and printing the image-processed image data by the printer 135.

The fax unit 140 controls facsimile communication with an external apparatus on a telephone line 142. For example, the MFP 100 subjects image data generated by the scanner 134 to image processing by the image processing circuit 136 and transmits the image-processed image data to an external apparatus via the telephone line 142, or receives data from an external apparatus, subjects the received data to image processing by the image processing circuit 136, and prints the image-processed data by the printer 135. Alternatively, the MFP 100, by the image processing circuit 136, converts image data generated by the scanner 134 to a scan file having a format such as JPEG, PDF, or TIFF. The MFP 100 realizes the SEND function by transmitting a generated scan file from the network I/F 138, by a communication protocol such as SMTP, FTP, or SMB. In the present embodiment, a function for transmitting a scan file having a format such as JPEG, PDF, or TIFF by the SMTP protocol is referred to as an electronic mail transmission function, and a function for transmitting a scan file by FTP, SMB or WebDAV is referred to as a file transmission function. As one type of a SEND function, there is an IFAX function which is specified by RFC 2305, and a facsimile function is realized by transmitting or receiving an email to which a scan file is attached to or from a device of the same type.

The IFAX function, by the image processing circuit 136, generates a TIFF file, which is specified by RFC 3949, from image data generated by the scanner 134, and transmits the TIFF file by the SMTP protocol. Alternatively, SMTP or the POP3 protocol is used to receive a TIFF file, and after the TIFF file is converted to an internal image format image by the image processing circuit 136, the converted internal image format image is printed by the printer 135. The serial I/F 143 is a serial I/F such as RS232C, and is an I/F for connecting an external serial device to the MFP 100. A card reader 144 is connected to the serial I/F 143, information recorded on a card 105 can be read, and it is possible to perform user authentication of a card owner by this information.

<Operation Screen View>

Figure 3:
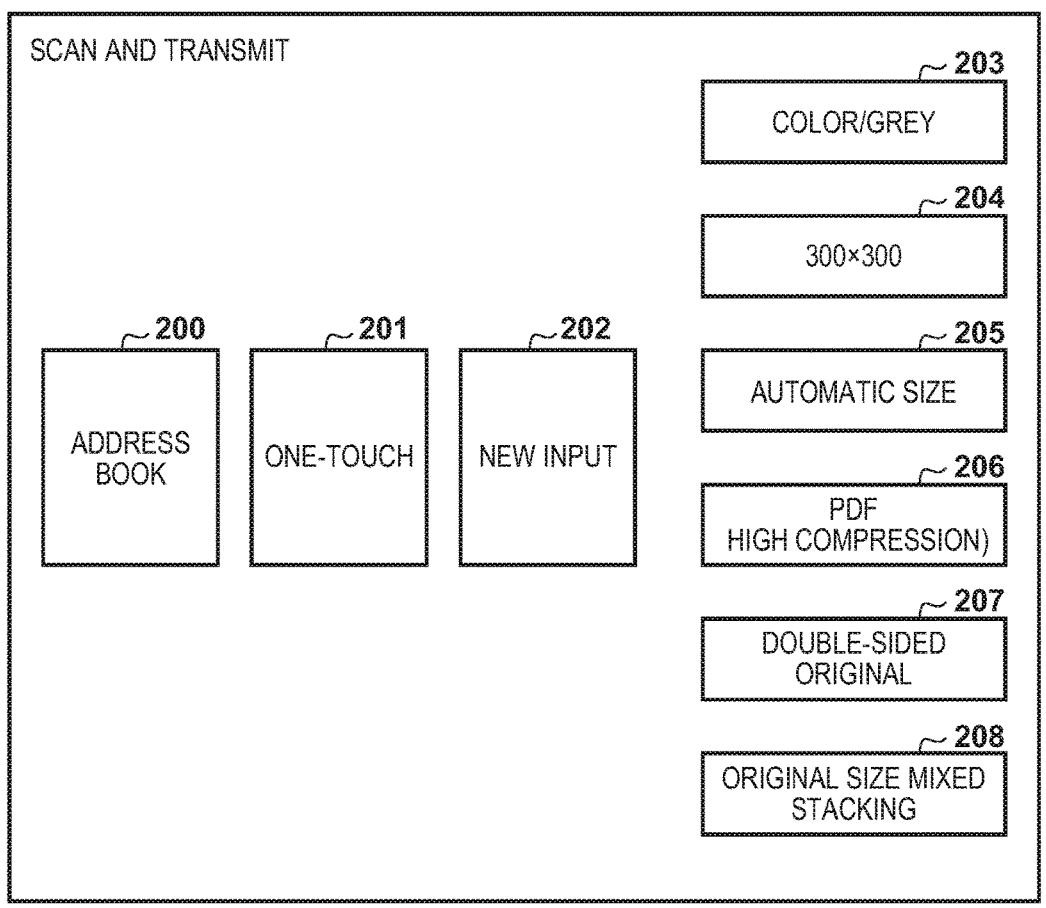
FIG. 3 is a view for illustrating a screen for operating a SEND function according to an embodiment.

Next, with reference to FIG. 3, description is given for a screen for operating the SEND function that is displayed on the operation unit 133. Through the operation unit 133, upon selecting an address book 200 or a one-touch 201, a user can set an address that is already registered to the address book or the one-touch to a destination. In a case of making a transmission to an address that is not registered, the user can input or select the address from a new input 202. Color selection 203 enables a user to select how to scan: whether to scan a color or black and white (monochrome) image by the scanner 134, or whether to scan after the automatic selection of an optimal scanning method in accordance with the color of an original. Resolution 204 is a button for designating a resolution for a time of scanning an original, and a resolution of 300×300 is designated here. A sheet selection button 205 is a button for designating a size of an original that is scanned by the scanner 134, and it is possible to select an automatic size for scanning a size that is detected by a feeder (not illustrated) that the scanner 134 is equipped with, or a predetermined size such as A3, B4, A4, B5, or A5. A file format selection button 206 is a button for selecting the file format of an image file to transmit, and details thereof are described later using FIG. 4. A double-sided original button 207 is a button that enables a user to select whether to scan only one side of an original that is set in the feeder, or whether to scan both sides. In a case where a double-sided original is selected, it is possible to select up-down opening or left-right opening. Original size mixed stacking 208 is a button for, in a case where originals of a plurality of pages is to be scanned, selecting whether originals of different sizes are included, or whether originals of all the same size are included. When originals being all the same size is selected, it is possible to scan with higher speed because the MFP 100 does not detect the sheet size of second and subsequent originals.

Figure 4:
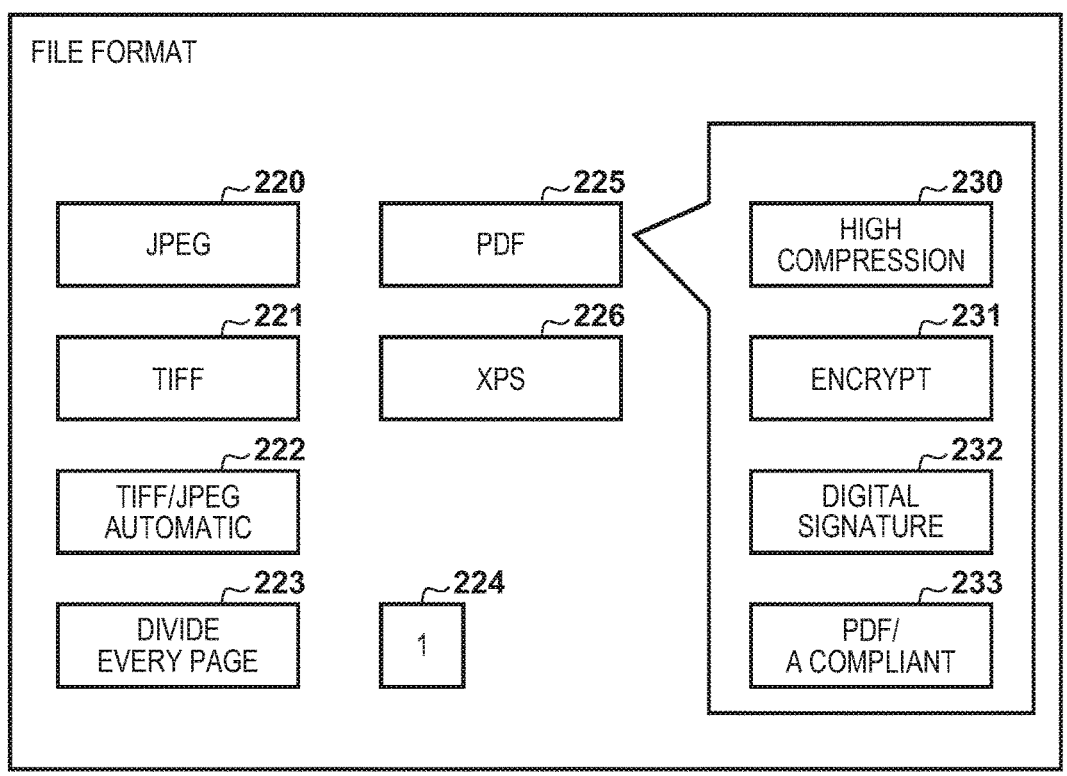
FIG. 4 is a view for illustrating a screen for selecting a file format according to an embodiment.

Next, with reference to FIG. 4, description is given for a screen for selecting a file format that is displayed on the operation unit 133 when the file format selection button 206 of FIG. 3 is pressed. When a JPEG button 220 is selected, the MFP 100 is set so that image data for each single page is converted to a JPEG file and each JPEG file is transmitted. When a TIFF button 221 is selected, the MFP 100 is set so that image data is converted to a TIFF file and the TIFF file is transmitted. When a TIFF/JPEG automatic button 222 is selected, the MFP 100 is set so that when monochrome scan is selected image data is converted to a TIFF file and the TIFF file is transmitted and when color scan is selected image data is converted to a JPEG file and the JPEG file is transmitted.

A divide button 223 is a button for selecting whether to generate a scan file by dividing data for each predetermined number of pages, in a case of selecting a file format for the scan file that includes converted image data of a plurality of pages. When the divide button 223 is selected, it is possible to input a division page count into a division page count 224, and the MFP 100 is set so that a scan file is generated and transmitted for each inputted number of pages. By this, it is possible to reduce the file size of one scan file, or scan in one batch originals that are divided each predetermined number of pages and generate a scan file for each respective division. Note that setting may be made so that the divide button 223 cannot be selected if a file format for generating a scan file for each page is selected, as with the JPEG button 220. Alternatively, the divide button 223 may be made selectable even in the case where a file format for generating a scan file for each page is selected. In this case, it is sufficient if a plurality of scan files are transmitted so that they can be identified by a receiving side, and, for example, the plurality of scan files may be inputted into one folder before being transmitted, or the plurality of scan files may be converted to a different file format such as a ZIP file before being transmitted.

When a PDF button 225 is selected, the MFP 100 is set so that scan data is converted to a PDF file and the PDF file is transmitted. Similarly, when an XPS button 226 is selected, the MFP 100 is set so that scan data is converted to an XPS file and the XPS file is transmitted. When the PDF button 225 or the XPS button 226 is selected, file format detailed settings buttons 230 through 233 are displayed, and it is possible to select one or more items. When high-compression 230 is selected, the MFP 100 can separate scan data into text regions and image regions, select an appropriate resolution and compression mode for each region, and generate a high-compression file that has a low data size. When an encryption button 231 is selected, it is possible to generate a file that is encrypted based on an inputted password. When digital signature 232 is selected, it is possible to add to a file a digital signature that includes device body number information which is set in advance, a user's digital signature, or the like, and alteration detection becomes possible. When PDF/A conformity 233 is selected, a file that is suitable for long-term storage and is specified by ISO 19005-1 is generated.

<First Embodiment>

Below, description will be given for a first embodiment of the present invention. In the present embodiment, with reference to FIGS. 5 to 9, description is given of the MFP 100 which scans an original of five pages, converts the original to scan files in the JPEG format, and transmits the scan files.

Figure 5:
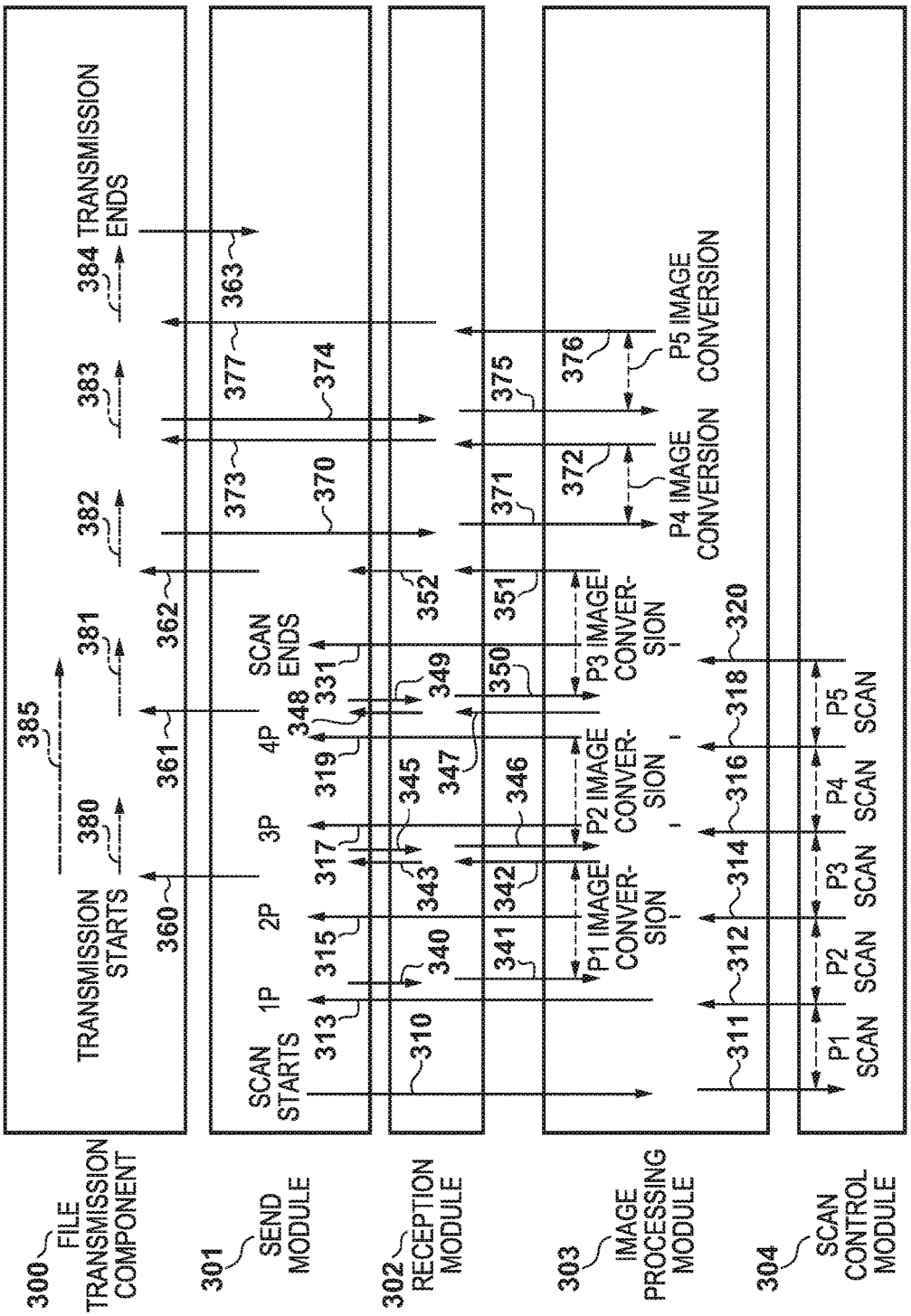
FIG. 5 is a sequence diagram for describing operations of a module group according to an embodiment.

Firstly, with reference to FIG. 5, description is given for an example of a processing sequence for a group of control software programs (modules) that operate by the CPU 130 at a time when the SEND function operates on the MFP 100 according to the first embodiment. Processing executed by a respective module is realized by the CPU 130 executing a module that is loaded into the RAM 132 from the ROM 131 or the hard disk 137. Note that, modules are illustrated and described in order to facilitate understanding, but it should be understood that one program may realize the functions of two or more modules, and a plurality of program groups may interlink to realize the function of one module.

A real-time OS is installed in the MFP 100, and a plurality of tasks are executed in parallel. A file transmission component 300 is a module for transmitting a generated scan file to the file server 101 by using a protocol such as SMB, FTP, or WebDAV. A SEND module 301 is a module for realizing the SEND function by controlling various module related to the SEND function, such as the scanner 134.

A scan control module 304 controls the scanner 134 and outputs image data. An image processing module 303 is an image conversion module that receives an image conversion command, and uses hardware of the image processing circuit 136 to actually execute image conversion to generate converted image data from image data. Due to hardware restrictions, the image processing module 303 is not necessarily able to simultaneously process a plurality of image conversion commands. Accordingly, a reception module 302 accepts and manages a plurality of image conversion commands, and operates so as to, when the image processing module 303 finishes processing one image conversion command, provide the image processing module 303 with the next image conversion command.

In the case of direct transmission of a facsimile, when the scan of one page ends, the module operates so as to wait until untransmitted converted image data becomes smaller than a predetermined amount, and execute a scan when the amount of untransmitted converted image data is less than or equal to the predetermined amount. However, with the SEND function, it is possible to perform processing at high speed by starting a scan of a subsequent page without considering a transmission operation.

A user sets an original on the feeder of the scanner 134, and sets a transmission destination and a transmission file format. When the user presses a start key (not illustrated) of the operation unit 133, scan start commands 310 and 311 are sent from the SEND module 301 to the scan control module 304 via the image conversion module. Upon accepting the scan start command 311, the scan control module 304 instructs the scanner 134 to scan. When scanning of each pages ends, the scanner 134 transmits respective scan completion commands 312, 314, 316, 318, and 320 for respective pages to the image processing module 303, and makes a notification that image data for a respective page has been generated. Upon receiving the scan completion command 313 from the image processing module 303, the SEND module 301 issues to the reception module 302 an image conversion command 340 for converting image data for the first page to a file format designated by a user. The image conversion command 340 is transmitted to the image processing module 303 as an image conversion command 341, and image conversion is performed by the image processing circuit 136.

When the image processing module 303 converts the image data for the first page to converted image data of the predetermined file format, an image conversion completion 342 indicating that the image conversion of the first page has ended is returned from the image processing module 303 to the reception module 302. The image conversion completion 342 is notified from the reception module 302 to the SEND module 301 as an image conversion completion reply 343, and the converted image data is sent to the SEND module 301.

In the first embodiment, because the scan of the second page has already ended when the image conversion completion 343 is notified, image conversion commands 345 and 346 are inputted and the image data for the second page is subject to image conversion similarly to the image data for the first page. When the image conversion for the second page ends, image conversion completions 347 and 348 are notified. Because the scan of the third page has ended at a timing when the image conversion completion 348 is notified, image conversion is similarly executed by image conversion commands 349 and 350. When image conversion of the third page ends, the converted image data is sent from the image processing module 303 to the SEND module 301 together with image conversion completions 351 and 352.

The SEND module 301, having received the image conversion completion 343 and known that conversion of the first page of image data has completed, notifies a transmission start command 360 to the file transmission component 300. The file transmission component 300, having received the transmission start command 360, starts transmission of the first page of converted image data by an image data transmission 380. When the image data transmission 380 is started, a scan operation, image conversion, and data transmission are being executed in parallel. Next, the SEND module 301, having received the image conversion completion 348 to be notified that conversion of the second page of image data has completed, transmits a transmission start command 361 for the second page to the file transmission component 300. Similarly below, a transmission start command 362 for the third page is transmitted to the file transmission component 300 to notify that image conversion of the third page has completed. Because the scan operation for the original of the fifth page has completed when the file transmission component 300 receives the transmission start command 362, an all scan completion notification which indicates that scanning of all pages is complete is also included in the transmission start command 362. Note that the all scan completion notification may be transmitted to the file transmission component 300 separately from the transmission start command.

When the image processing module 303 converts the second page of image data, the file transmission component 300 transmits a scan file that includes the converted image data at reference numeral 381, and when the third page of image data is converted, transmission of the third page is performed at reference numeral 382. The file transmission component 300, upon receiving a notification included in the transmission start command 362 that scan operation has completed with a total of five pages and that conversion of the third page of image data is complete, controls as follows. In other words, the file transmission component 300 commands the reception module 302, by an image conversion command 370, to convert the fourth page of image data.

The reception module 302 commands the image processing module 303 to convert the fourth page of image data by an image conversion command 371. When the image conversion of the fourth page of image data completes, a scan file including converted image data for the fourth page is transmitted to the file transmission component 300 by an image conversion completion 372 and a transmission start command 373. The file transmission component 300, having been notified that image conversion for the fourth page is complete, transmits a scan file including converted image data for the fourth page at reference numeral 383. In other words, the file transmission component 300 transmits to the reception module 302 an image conversion command 374 for converting the fifth page of image data. When the conversion of the fifth page of image data completes, an image conversion completion 376 and a transmission start command 377 are transmitted, a transmission 384 of a scan file including converted image data for the fifth page is executed, and a transmission end command 363 is notified when the transmission 384 completes.

The transmission speed of the converted image data can greatly change due to the data size of the converted image data, the communication quality of the network, and load on the server. For example, if the data size of the first page of converted image data is larger and the data size of the second page of converted image data is small, there are cases where it will take some time to transmit the first page of the converted image data as with a transmission 385. In such a case, a transmission 381 for the second page of converted image data can be executed in parallel with the transmission 385. Even in such a case, it is possible to shorten transmission time by transmitting converted image data for a plurality of pages in parallel.

A mode in which the MFP 100 operates so as to transmit a plurality of pages of converted image data in parallel is referred to as a parallel transmission mode. However, if a user selects a PDF file where one file comprises a plurality of pages as the transmission file format of FIG. 4, the second page of converted image data does not need to be transmitted before transmission of the first page of converted image data ends. A mode in which the MFP 100 operates so as to transmit image data for each single page in this way is referred to as a sequential transmission mode.

Figure 6:
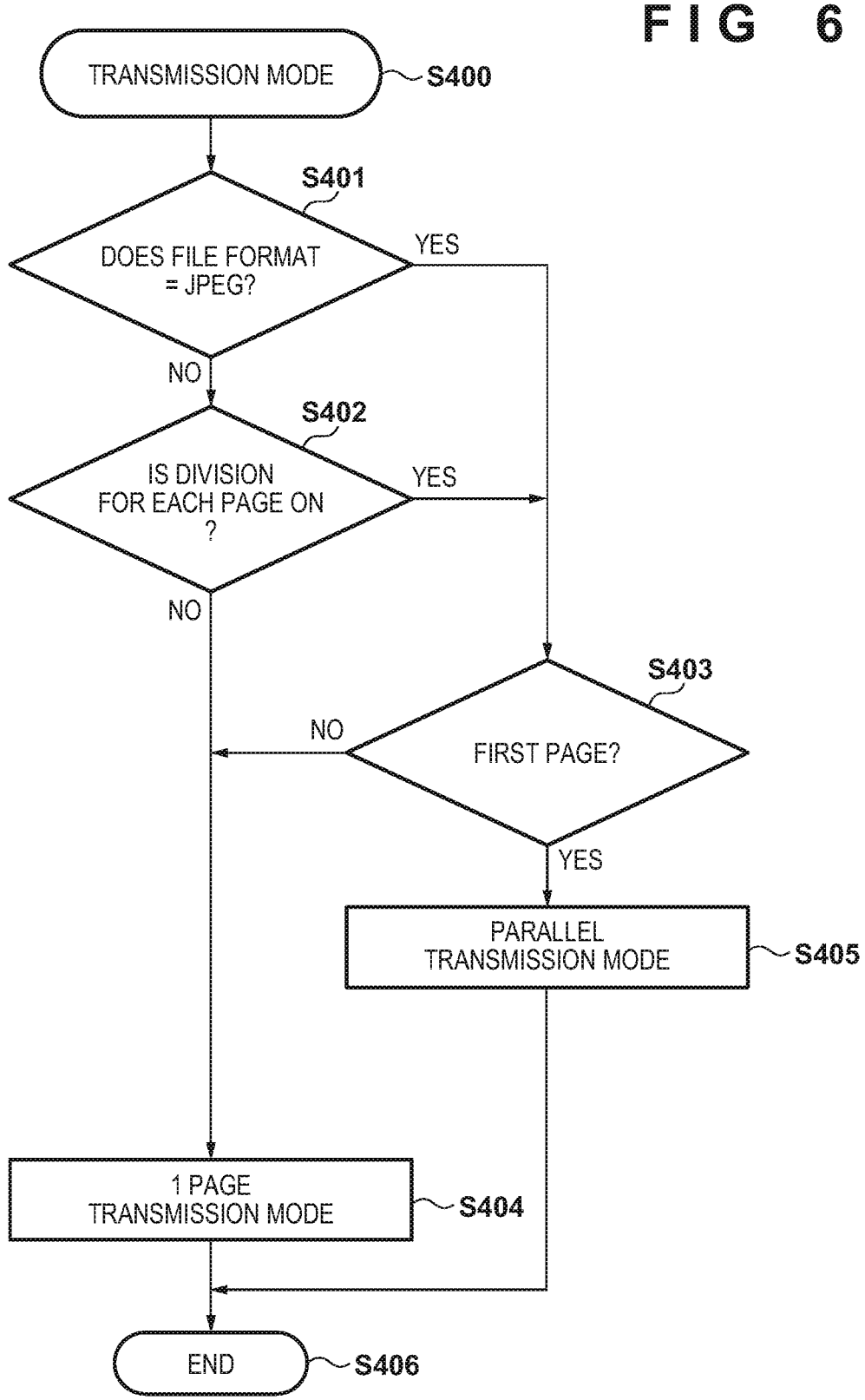
FIG. 6 is a flowchart for determining a transmission mode according to an embodiment.

Next, with reference to FIG. 6, description is given for a flowchart for illustrating processing for selecting whether the MFP 100 operates in the parallel transmission mode or the sequential transmission mode. Processing illustrated by this flowchart is achieved by the CPU 130 executing a program that is loaded into the RAM 132.

In step S401, if the JPEG button 220 is selected for the transmission file format, the CPU 130 advances the processing to step S403, and determines whether a page to transmit is the first page in a file.

Because a JPEG file is configured by one file and one page, it is always determined to be a first page in step S403, the processing advances to step S405, and the parallel transmission mode is selected. When a file format other than JPEG is selected, the CPU 130 advances the processing to step S402, and determines whether the divide button 223 is selected for each page. When the divide button 223 is selected for each page and the page is the first page, the processing advances from step S403 to step S405, and the parallel transmission mode is selected. In a case other than a first page, in step S404, after transmission of the preceding page ends, the sequential transmission mode for transmitting subsequent pages is selected. When the sequential transmission mode is selected, a transmission operation is awaited and as a result transmission time lengthens.

By this processing, if the format of a transmission file is PDF, the parallel transmission mode is automatically selected, and it is possible to shorten transmission time by transmitting converted image data for a plurality of pages in parallel. In addition, even if the format of the transmission file is not PDF, the parallel transmission mode is automatically selected if it is a file having a single page.

Figure 7:
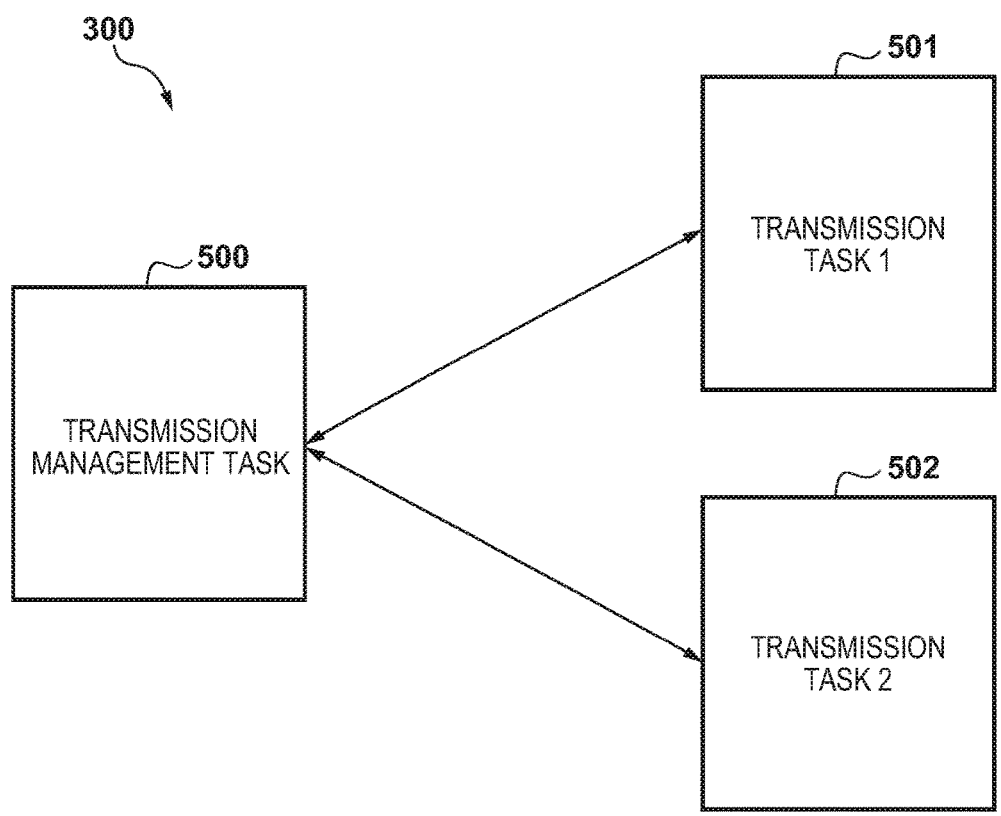
FIG. 7 is a view for illustrating a task configuration of a file transmission component 300 according to an embodiment.

With reference to FIG. 7, description is given for a task configuration of the file transmission component 300. In the first embodiment, the file transmission component 300 includes a transmission management task 500, a transmission task 501, and a transmission task 502. The transmission management task 500 controls the two transmission tasks based on, for example, a received transmission start command or converted image data. The transmission tasks 501 and 502 may have first in, first out (FIFO) buffers, and one transmission task does not need to be able to transmit a plurality of pieces of converted image data at the same time. By the transmission tasks 501 and 502 operating in parallel, it is possible to transmit two pieces of converted image data in parallel. Although the number of pieces of converted image data (number of tasks) for which parallel transmission is possible is described as two in the first embodiment, the number of transmission tasks may be a predetermined number, and it is possible to increase the number of pieces of converted image data that can be transmitted in parallel by increasing the number of transmission tasks.

Figure 8:
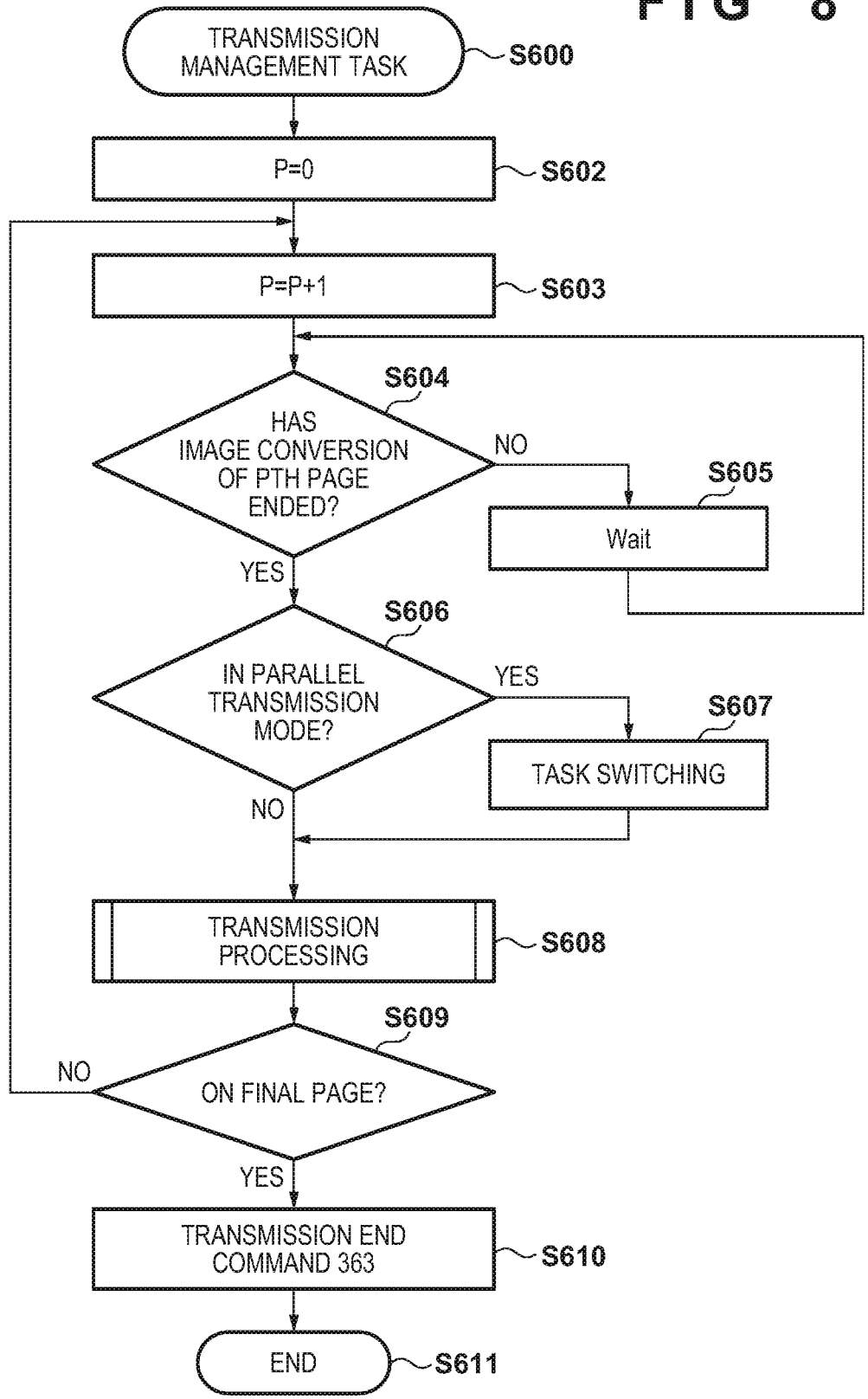
FIG. 8 is a flowchart for illustrating processing of a transmission management task according to an embodiment.

FIG. 8 is a flowchart for describing operation of the transmission management task 500 that is executed by the MFP 100 according to the first embodiment. Processing illustrated by this flowchart is achieved by the CPU 130 executing a program that is loaded into the RAM 132. Note that processing indicated by this flowchart may be started each time the SEND function for performing scan and transmit is executed.

When processing is started in step S600, the CPU 130 advances the processing to step S602, and initializes to 0 a variable P for indicating a number of pages for which transmission processing has been performed. Next, in step S603, the CPU 130 adds 1 to the variable P. Next, the processing advances to step S604, and the CPU 130 determines whether image conversion for the P-th page has ended. In other words, the CPU 130 determines a transmission start command for the P-th page has been received from the SEND module 301. When this transmission start command has not been received, the CPU 130 waits a predetermined amount of time in step S605 so that CPU time is used for other tasks, and then the processing returns to step S604. Upon receiving the transmission start command in step S604, the processing proceeds to step S606, and the CPU 130 determines whether the parallel transmission mode has been set for the P-th page. When it is determined that the parallel transmission mode is set, the CPU 130 advances the processing to step S607, switches tasks, and advances to step S608. Here, a task switch may be, for example, setting so as to use the transmission task 502 if there was a setting so that the transmission task 501 is used at present. Alternatively, a task switch may be selecting a transmission task for which transmission processing is currently not being performed. Alternatively, the transmission management task 500 may newly generate a transmission task.

When it is determined in step S606 that the sequential transmission mode instead of the parallel transmission mode is set or when the task switch of step S607 completes, the CPU 130 advances the processing to step S608. The CPU 130 then commands so as to transmit converted image data for the P-th page to the selected transmission task. Next, the processing advances to step S609, and the CPU 130 determines whether the P-th page is the final page of the scan. In other words, a scan completion notification is received, and it is determined whether P matches information of a total number of pages included in the scan completion notification. When it is determined in step S609 that the P-th page is not the final page, the processing returns to step S603, and processing for step S603 and thereafter is executed again. When it is determined in step S609 that the P-th page is the final page, the processing proceeds to step S610, and, after transmission of the converted image data, the CPU 130 transmits a transmission end command 363 to the SEND module 301, and in step S611 the processing ends.

Figure 9:
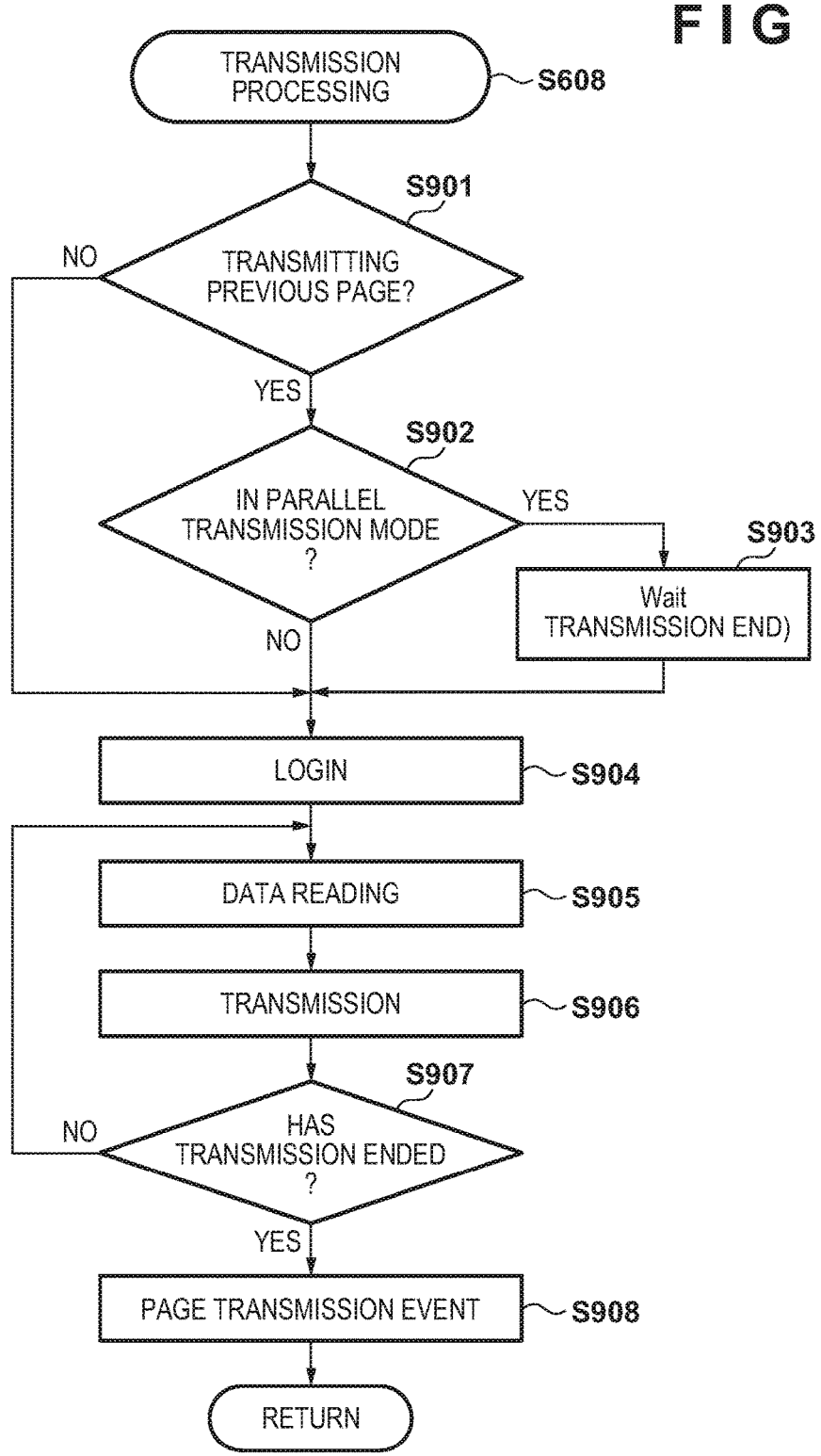
FIG. 9 is a flowchart for illustrating processing of a transmission task according to an embodiment.

FIG. 9 is a flowchart that illustrates the transmission processing of step S608 of FIG. 8. Processing illustrated by this flowchart is achieved by the CPU 130 executing a program that is loaded into the RAM 132.

This processing is started by information of the variable P which indicates the page to transmit is conveyed from the transmission management task 500, which received the transmission start command, to the transmission task 501 or 502.

In step S901, the CPU 130 determines whether the converted image data of the page before the page that is currently being processed and is indicated by the variable P is being transmitted. When it is determined that this page is being transmitted, the processing proceeds to step S902, it is determined whether the transmission mode is the parallel transmission mode, and when it is determined that the transmission mode is the parallel transmission mode, the processing proceeds to step S904, and transmission of the image data is started by this transmission task. Meanwhile, when the CPU 130 determines in step S902 that the transmission mode is not the parallel transmission mode, the processing proceeds to step S903, the end of transmission of the previous page which is being transmitted is awaited, and then the processing advances to step S904.

In step S904, the CPU 130 logs in to a server for the transmission destination. Next, the processing advances to step S905, and the CPU 130 reads the data with the size of a predetermined size, and transmits the data in step S906. In step S907, the CPU 130 determines whether transmission of one page has ended, the processing returns to step S905 when the CPU 130 determines that transmission of the one page has not ended. When the CPU 130 determines in step S907 that the transmission has ended, the processing proceeds to step S908, a page transmission event indicating that transmission is complete is returned to the transmission management task 500, and this processing ends.

By virtue of the first embodiment as described above, it is possible to scan an original that includes a plurality of pages, and transmit image data for the plurality of pages in parallel when transmitting the scanned image data to a server on a network. Accordingly it is possible to shorten the amount of time from the start of scanning until the end of transmission.

<Second Embodiment>

Below, description will be given for a second embodiment of the present invention. In the present embodiment, with reference to FIGS. 6 to 10, description is given of an MFP which scans an original of five pages, converts the original to divided scan files in the PDF format for every two pages, and transmits the scan files. Note that the MFP 100 according to the present embodiment has a hardware configuration that is the same as that of the MFP 100 of the first embodiment previously described. In addition, the same reference numerals are used for matters that are the same as the first embodiment described above in the processing sequence, flowcharts, and task configuration, so description for matters that are the same are omitted, and description is given only for points of difference.

Description is given for selection of a transmission mode of FIG. 6, in the second embodiment. In step S401, a file format is confirmed, and because the file format is the PDF format here, the CPU 130 advances the processing to step S402. In step S402, because there is a setting so that a division is made every two pages, the CPU 130 advances the processing to step S403. In step S403, the CPU 130 assigns the parallel transmission mode to only the divided first page, and assigns the sequential transmission mode to the other page. In other words, the first, third, and fifth pages are set to the parallel transmission mode, and the second and fourth pages are set to the sequential transmission mode.

Next, the transmission management task flow diagram of FIG. 8 is used to describe a transmission management task assignment flow of the present embodiment.

In step S606, because the first page is set to the parallel transmission mode, for example it is assigned to the transmission task 501 in step S607. Next, for the second page, in step S606, the parallel transmission mode is not set, and it is assigned to the transmission task 501 which is the same as for the first page. Next, for the third page, in step S606, it is determined that the parallel transmission mode is set, and the third page is assigned to the transmission task 502 which is different to that for the first and second pages. Similar processing is repeated, and the fourth page is assigned to the transmission task 502, and the fifth page is assigned to the transmission task 501.

Next, with reference to FIG. 10, description is given for a transmission sequence of the second embodiment. Firstly, at reference numeral 390, the transmission task 501 starts transmission of the converted image data for the first page which is the transmission target. Next, at reference numeral 391, the transmission task 501 transmits the converted image data for the second page which is the transmission target. Before transmission of the converted image data of the second page by the transmission task 501 completes, the transmission start command 362 for the third page is received at reference numeral 362. For this reason, transmission of the converted image data for the third page which is the transmission target is started by the transmission task 502. Similarly, before transmission of the converted image data of the third page by the transmission task 502 completes, the transmission start command 377 is received at reference numeral 377. In this case, a switch is made to the transmission task 501, and transmission of the fifth page which is a transmission target starts.

Consideration is given for a case where the transmission start command 377 for the fifth page is received while converted image data for the first and second pages is being transmitted by the transmission task 501 and converted image data for the third and fourth pages is being transmitted by the transmission task 502. This situation may occur when time is incurred for transmission of converted image data due to a decrease of communication quality, for example. In such a case, transmission of the converted image data for the later fifth page is delayed until the number of pieces of converted image data which are being transmitted in advance becomes less than the number of transmission tasks (two here), so as to not be transmitting more converted images than the number of transmission tasks. Furthermore, the switching of the transmission task in step S607 or the execution of the transmission task in step S608 may be executed when the number of pieces of converted image data that are being transmitted is less than the number of transmission tasks. Consequently, in a case where transmission of converted image data for the first or second page by the transmission task 501 takes time and transmission of the converted image data for the third or fourth page by the transmission task 502 end first, the transmission task 502 is assigned to transmission of the fifth page of image data.

By virtue of the second embodiment as described above, even when a plurality of originals are scanned, a plurality of scan files are generated and one file includes a plurality of page images, it is possible to shorten transmission time by transmitting a plurality of scan files in parallel.

<Other Embodiments>

In the foregoing first and second embodiments, the switching of the transmission task of step S607 was explained as the transmission task being switched in the parallel transmission mode, and the same transmission task as for the previous page being used in the sequential transmission mode. However, the same transmission task as for the previous page may be assigned in the parallel transmission mode for a plurality of pages, in accordance with a condition such as that the transmission of the previous page is complete.

In addition, the processing illustrated in the flowcharts according to the present invention may be processed by the CPU 130 loading a control program stored in a memory such as the ROM 131 into the RAM 132, and executing the control program. In addition, although it is assumed that, one CPU 130 executes the processing illustrated in the flowcharts described above in the MFP 100, another configuration may be taken. In addition, configuration may be taken so that a plurality of CPUs cooperate to execute the processing indicated in the flowcharts described above.

By virtue of the present embodiment as described above, for example, in a case where it takes a long time for the procedure until the transmission of one scan file starts, it is possible to perform a procedure for starting transmission during transmission of the scan file of a previous page, and abbreviate the time. In addition, for example, in a case such as where there is leeway for the communication speed but it takes a long time for transmitting or receiving a scan file because a processing speed for a single connection is restricted by the receiving side, it is possible to improve the communication speed by sending a plurality of scan files in parallel. Furthermore, in the present embodiment, because single files are transmitted in parallel, a receiving node does not need special processing such as image processing, and it is possible to increase the speed of scan file transmission with low cost.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-214190, filed Nov. 6, 2017, which is hereby incorporated by reference herein in its entirety.

What is claimed is:

1. An image processing apparatus to perform a file transmission, comprising:
    a scanner;
    a network interface;
    a memory storing instructions; and
    a processor operable to execute the instructions to cause the image processing apparatus to:
    accept a designation of a transmission setting;
    convert, in accordance with the transmission setting, image data generated from an original of a plurality of pages by the scanner to one or more files;
    if a designation for converting one page of image data to one file is made by the transmission setting, control the file transmission to allow a plurality of files of converted image data to be transmitted in parallel via the network interface; and
    if a designation for converting a plurality of pages of image data included in the original to one file is made by the transmission setting, control the file transmission, for the plurality of pages worth of image data converted to the one file, to perform transmission of a subsequent page of image data, via the network interface, after transmission of a preceding page of image data ends.

2. The image processing apparatus according to claim 1, wherein generation of the image data, conversion to the file, and control of the file transmission of image data via the network interface are performed in parallel.

3. The image processing apparatus according to claim 1, wherein the instructions further cause the image processing apparatus to:
    if a designation for converting a plurality of pages of image data to a plurality of files, for each division page designated by the transmission setting, is made, and if a transmission target page is a first page of any file after the conversion, control the file transmission to allow image data for the transmission target page to be transmitted in parallel with image data of a page of a preceding different file via the network interface.

4. The image processing apparatus according to claim 3, wherein the instructions further cause the image processing apparatus to:
    if the designation for converting the plurality of pages of image data to the a plurality of files, for each division page designated by the transmission setting, is made, and if a transmission target page is not the first page of any file after the conversion, control the file transmission to perform transmission of image data of the transmission target page via the network interface after transmission of image data of a preceding page of the same file ends.

5. The image processing apparatus according to claim 1, wherein the designation by the transmission setting for converting one page of image data to one file includes a file format of JPEG.

6. The image processing apparatus according to claim 1, wherein the designation by the transmission setting for converting one page of image data to one file includes a file format different to JPEG and one page as a division page.

7. A method of controlling of an image processing apparatus performing a file transmission, having a scanner, the method comprising:
    accepting a designation of a transmission setting;
    converting, in accordance with the transmission setting, image data generated from an original of a plurality of pages by the scanner to one or more files;
    if a designation for converting one page of image data to one file is made by the transmission setting, controlling the file transmission to allow a plurality of files of converted image data to be transmitted in parallel; and
    if a designation for converting a plurality of pages of image data included in the original to one file is made by the transmission setting, controlling the file transmission, for the plurality of pages worth of image data converted to the one file, to perform transmission of a subsequent page of image data after transmission of a preceding page of image data ends.

* * * * *